United States Patent [19]

Millsapps, Jr.

[11] Patent Number: 4,942,930
[45] Date of Patent: Jul. 24, 1990

[54] LUBRICATION SYSTEM FOR AN EARTH BORING DRILL BIT AND METHODS FOR FILLING AND RETROFIT INSTALLING THEREOF

[75] Inventor: Stuart C. Millsapps, Jr., Houston, Tex.

[73] Assignee: Cummins Engine Company, Inc., Columbus, Ind.

[21] Appl. No.: 316,770

[22] Filed: Feb. 28, 1989

[51] Int. Cl.$^5$ .............................................. E21B 10/24
[52] U.S. Cl. .................................... 175/228; 175/339; 175/372; 76/108.2; 141/7; 141/114; 184/6.15; 384/93
[58] Field of Search ............... 175/228, 227, 339, 371, 175/372; 76/108 A; 141/7, 114; 184/54, 6.15, 88.2, 89; 384/93

[56] References Cited

U.S. PATENT DOCUMENTS

| | | | |
|---|---|---|---|
| 3,476,195 | 11/1969 | Galle | 175/228 |
| 3,721,306 | 3/1973 | Sartor | 175/228 |
| 3,917,028 | 11/1975 | Garner | 175/228 |
| 3,942,596 | 3/1976 | Millsapps | 175/227 |
| 4,055,225 | 10/1977 | Millsapps | 175/228 |
| 4,274,498 | 6/1981 | Penny | 175/228 |
| 4,276,946 | 7/1981 | Millsapps | 175/228 |
| 4,552,228 | 11/1985 | Evans et al. | 175/228 |

FOREIGN PATENT DOCUMENTS 2027095 2/1980 United Kingdom ................ 175/228

Primary Examiner—Bruce M. Kisliuk
Attorney, Agent, or Firm—Sixbey, Friedman, Leedom & Ferguson

[57] ABSTRACT

A lubrication system for an earth boring drill bit having a pressure compensator for minimizing the pressure differential between the drill bit lubricant and the well bore fluid is improved in a manner to prevent sharp edges in the lubricant reservoir wall from damaging the flexible diaphragm and for enabling the lubricant space available in the lubricant reservoir to be maximized. In accordance with a preferred embodiment, the pressure compensator is positioned on a shoulder ring in the lubricant reservoir and the shoulder ring retains the open end of a pressure diaphragm within an interior recess of a compensator cap, the diaphragm sealing against a perimetric wall of the recess. Methods of filling the lubrication system with the pressure compensator installed or removed are provided which avoid stretching or damage to the diaphragm while still maximally filling of the lubrication system with lubricant. Furthermore, a method is achieved by which the invention lubrication system may be provided in existing drill bits by retrofit installation.

14 Claims, 4 Drawing Sheets

LUBRICATION SYSTEM FOR AN EARTH BORING DRILL BIT AND METHODS FOR FILLING AND RETROFIT INSTALLING THEREOF

BACKGROUND OF THE INVENTION

1. Field of the Invention

The present invention relates to lubrication systems for earth boring drill bits, and in particular to pressure compensators for equalizing lubricant pressure in the system with respect to bore hole fluid, as well as to the methods by which such systems are filled and installed.

2. Description of Related Art

Earth boring drill bits use various types of lubrication systems, and in the case of rotatable cutter type earth boring drill bits, in particular, it is common for lubrication systems to be used which include a pressure compensator to minimize the pressure differential across a bearing seal used in the drill bit. Typically, such a pressure compensator for a lubrication system of an earth boring drill bit uses a flexible diaphragm which is sealed in a lubricant reservoir so that the lubricant is in contact with one side of the pressure compensator diaphragm, and the well bore fluid is in contact with the opposite side thereof for purposes of equalizing the lubricant pressure with the pressure of the fluid in the well bore. Numerous types of pressure compensators are known, but, generally, they can be classified into one of two main categories, i.e., top vented and bottom vented pressure compensators.

Examples of drill bits having bottom vented pressure compensators can be found, for example, in U.S. Pat. No. 3,476,195, issued to Galle, as well as in U.S. Pat. Nos. 4,055,225 and 4,276,946 of the present inventor. An advantage of using a bottom vented pressure compensator, as shown in these patents, is that well bore fluid and cuttings are able to drain through the vent hole of the pressure compensator as the bit is being removed from the well since the vent hole is located in the lower end of the compensator. On the other hand, a disadvantage of this type of lubrication system is the necessity to seal the pressure compensator in the bottom portion of the lubricant reservoir, in addition to sealing a compensator cap which closes the upper end of the reservoir. Furthermore, bottom vented compensators face the problem that vent holes through which the well hole materials are forced to fill the area below the pressure compensator can become partially or totally blocked with well hole cuttings in a manner preventing proper operation of the compensator which, in turn, can result in damage to the bearing seals. A pressure compensator that is vented to the well bore fluid through the top of the lubricant reservoir is not subject to such difficulties.

Examples of various types of top vented compensators for earth boring drill bits can be found in Garner U.S. Pat. No. 3,917,028, the present inventor's U.S. Pat. No. 3,942,596, and U.S. Pat. No. 4,552,228, issued to Evans, et al. The diaphragm of top vented compensators is generally cup-like in shape, and whether of the folded wall type (U.S. Pat. Nos. 3,942,596 and 3,917,028) or of the elongated radially expansible type (U.S. Pat. No. 4,552,228) is provided with a mounting flange at an open upper end thereof. This flange typically has a greater diameter than that of the lubricant receiving space of the lubricant reservoir so as to be supported upon a shoulder of the reservoir, against which it is pressed by a cap of the compensator through which venting is achieved. Furthermore, in most instances, an inner surface of the open end of the diaphragm seats on a peripheral surface of a reduced diameter inner end of the cap of the compensator for improving the sealing produced as the cap presses the flange of the diaphragm against the reservoir shoulder.

To prevent damage to the diaphragm when the well hole fluid pressure is much greater than that of the lubricant, due to contact between the diaphragm and sharp edges of the lubricant reservoir, conventionally a metal stiffener or protector sleeve or cup is disposed about at least the upper end of the cup-like diaphragm or is molded into the wall of the diaphragm at the upper end thereof. In this way, the diaphragm cannot be damaged by, for example, the sharp edge formed at the junction of the lubricant reservoir and the passage by which the lubricant receiving space of the reservoir communicates with the bearings of the cutters, nor can the upper end of the diaphragm be extruded into that passage or down into the reservoir. However, the necessity for such a diaphragm supporting metal sleeve or cup complicates and increases the cost of the compensator of the lubrication system.

Additionally, besides the problems associated with a high pressure differential of the well hole fluid relative to the lubricant pressure, the need exists to avoid damage to the bearing seals as a result of an excessive lubricant pressure generated during raising or lowering of the drill bit, or occurring as a result of lubricant vaporization due to the heat and pressure imposed during operation of the drill bit. One method to eliminate the buildup of internal pressure is to use a pressure relief valve as is shown in U.S. Pat. No. 3,942,596. However, a relief valve, besides increasing costs, is an additional part of the lubrication system that must be sealed to prevent entrance of the well bore fluid into the lubricant side of the system. That is, failure of the relief valve or the seal around the relief valve can cause the lubrication system to fail. Furthermore, relief valves suffer the disadvantage that lubricant can leak out of the system when the valve opens.

Another method of reducing lubrication pressure buildup is to allow space in the reservoir for lubricant expansion. This can be done by removing a given amount of the lubricant after filling of the drill bit with lubricant. Alternatively, as in the case of Garner U.S. Pat. No. 3,917,028, when lubricant is to be introduced into the reservoir, a temporary cap is held in place in the open end of the reservoir instead of the cap of the compensator. This temporary cap is in the form of a closure plug having an inner end surface which extends a distance inwardly relative to the cup-like diaphragm that is significantly closer to the bottom of the lubricant reservoir than the bottom of the permanent cap does. With the plug and diaphragm installed, lubricant is pumped into the reservoir through a port near the bottom of the reservoir until the reservoir is filled to an extent pressing the diaphragm against the underside of the temporary cap. Thus, when the temporary cap is replaced by the compensator cap, a lubricant-free space will be provided between the upper side of the flexible diaphragm and the bottom portions of the cap of the compensator. This lubricant-free space can serve as an expansion space which will at least partially, if not entirely, relieve vaporized lubricant pressure buildup in the lubrication system. Thus, it is possible to close the lubricant filling port of the Garner reference by either a high pressure relief valve or a simple filler plug. On the other hand, by using a plug-like temporary filling cap that is deeper than the permanent compensator cap and then filling the reservoir with the diaphragm in place, an undesirable underfilling of the reservoir results.

All of the lubrication systems described above are relatively complex. These prior art systems utilize pressure compensators that have numerous areas that require very special attention to assure that sealing will be of the quality that will prevent lubricant loss and prevent leakage of bore hole fluid into the rock bit lubrication system. As such, even though such systems have been successful, a lubrication system having a pressure compensator of a simpler and more reliable design is needed.

SUMMARY OF THE INVENTION

It is a general object of this invention to provide a lubrication system having a pressure compensator that is simple and reliable and which avoids the above-noted problems.

It is a further object of the present invention to provide a lubrication system having a pressure compensator that will enable the amount of lubricant that can be placed in the lubricant reservoir to be maximized.

It is yet another object of the present invention to provide a lubrication system having a pressure compensator which is able to utilize a folded wall type, cup-like diaphragm in a top vented mode without requiring the use of a stiffener or protector sleeve or cup.

A still further object of the present invention is to provide a lubrication system for an earth boring drill bit that is capable of achieving the above objects and which is suitable for retrofit installation in existing earth boring drill bits, even drill bits of the bottom vented type.

Another important object of the present invention is to provide a lubrication system with a compensator of a diaphragm that is constructed and mounted in a manner wherein it is protected against being damaged by sharp edges of the lubricant reservoir without the need for additional protective elements being utilized.

It is yet another object of the present invention to provide methods for filling the inventive lubrication system in order to maximize the amount of lubricant that can be placed in the lubricant reservoir thereof.

Yet a still further object of the present invention is to provide a method whereby the lubrication system can be filled with lubricant while the compensator is fully assembled and installed in place, without collapsing or stretching of the diaphragm.

These and other objects of the invention are achieved in accordance with a preferred embodiment of a lubrication system in accordance with the present invention for an earth boring drill bit of the type having a bit body having cutters depending therefrom that are rotatably mounted on bearings which are supplied with lubricant from a reservoir formed in the bit body, and wherein lubricant pressure is balanced with bore hole fluid pressure via a folded wall type, cup-like flexible diaphragm that is mounted within the lubricant reservoir. The lubricant reservoir is closed by a cap that is sealed in the top of the reservoir and which is provided with vent means for admitting well bore fluid into contact with the top side of the flexible diaphragm, the bottom side contacting lubricant contained within the reservoir. In order to prevent damage to the diaphragm and to maximize the amount of lubricant that can be placed in the lubricant reservoir, the cap has a recess that is peripherally bounded by an inner wall, the diameter of which is reduced relative to the diameter of the lubricant reservoir, and wherein an open end of the cup-like flexible diaphragm is sealingly mounted within the recess of the cap sealed against the inner wall of the cap. As a result, the diaphragm extends into the reservoir with a sufficient peripheral clearance between the folded wall of the diaphragm and the reservoir so as to prevent expansion of the diaphragm, in use, from bringing it against sharp edges of the reservoir, such as those that exist, for example, at the junction between the lubricant reservoir and the lubricant passage means used for supplying lubricant from the reservoir to the bearings of the cutters.

More specifically, the reservoir is provided with a shoulder upon which a shoulder ring having an inner diameter that is less than the diameter of the inner wall of the recess of the cap is supported. Thus, the shoulder ring axially supports the diaphragm, so that the shoulder ring retains the open end of the diaphragm sealingly inside of the recess formed in the cap of the compensator. In accordance with the preferred embodiment, the shoulder ring is a separate part from the cap and is clamped between the shoulder of the lubricant reservoir and the cap of the compensator, but it may be formed as part of the cap itself. This form of construction is particularly advantageous for maximizing the available lubricant space in the lubricant reservoir and for preventing sharp edges in the lubricant reservoir from damaging the diaphragm of the compensator during operation of the drill bit.

In accordance with a first method, the lubrication system of the present invention is filled with lubricant without the diaphragm of the compensator being in place. Instead, a lubricating plug is used that is designed to take up the exact space that will be utilized by the diaphragm and cap of the pressure compensator. After the system has been evacuated through the lubricating plug, lubricant is pumped through the plug into the system. After filling, the diaphragm and cap are installed, in place of the plug, along with a quantity of additional lubricant that is filled into a bottom recess of the diaphragm created by folding-in of its side wall, thereby ensuring that the lubricant reservoir is maximally filled despite such folding-in of the diaphragm.

Alternatively, a second lubricating method is achievable in accordance with the present invention, which method allows the system to be filled with lubricant with the pressure compensator fully assembled and installed in place within the lubricant reservoir. In accordance with this method, a pliable material is placed within the diaphragm and the recess of the compensator cap to prevent collapsing or stretching of the diaphragm when lubricant is pumped into the reservoir while still enabling the diaphragm to balance the pressure of bore hole fluid on one side of the diaphragm with that of the lubricant on the other side thereof, during use of the bit. In accordance with this method, a separate filler port that communicates with the lubricant reservoir is provided, which must then be closed with a pressure plug after filling of the lubrication system with lubricant.

The construction of the pressure compensator of the lubrication system, as well as the methods by which the lubrication system of the present invention can be filled, are well suited to enabling existing drill bits to be retrofit equipped with a lubrication system in accordance with the present invention, irrespective of whether the drill bit was originally provided with either a top vented or a bottom vented pressure compensator. In the retrofit installation of the present invention in drill bits having bottom vented lubrication system pressure compensators, the bottom vent is plugged and welded sealed as part of the retrofitting process. In the case of the first of the above-noted filling methods, plugging of the bottom vent hole is performed prior to filling of the lubrication system with lubricant, while in the case of the second method the vent hole may be utilized for filling the system, after which it is then plugged and sealed.

These and further objects, features and advantages of the present invention will become more obvious from the following description when taken in connection with the accompanying drawings which show, for purposes of illustration only, several embodiments in accordance with the present invention.

DESCRIPTION OF THE PREFERRED EMBODIMENTS

Figure 1:
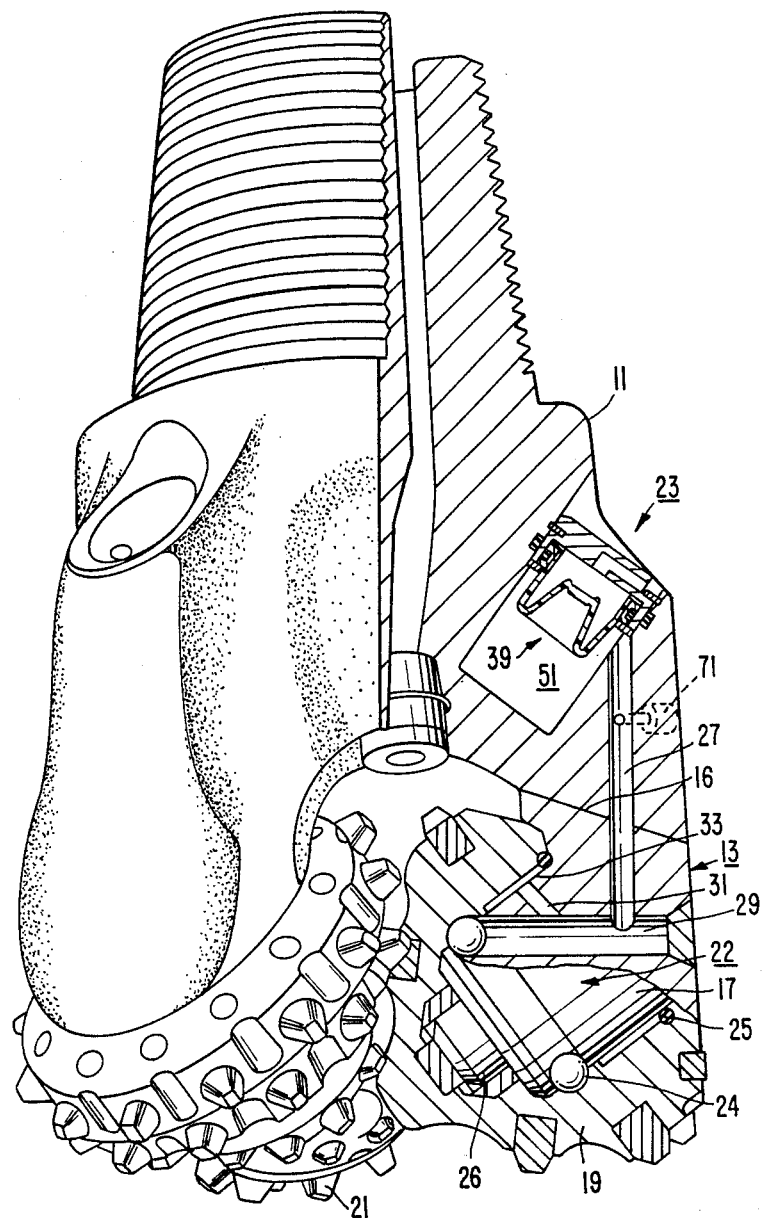
FIG. 1 is a partial cross-sectional view of an earth boring drill bit provided with a lubrication system in accordance with a preferred embodiment of the present invention.

FIG. 1 shows a cutter type earth boring drill bit having a bit body 11 with three cutter leg sections, designated generally by the reference numeral 13, that are preferably, but not necessarily, electron beam welded to the bit body 11 along seam 15. Each leg section 13 contains an integral bearing shaft 17 upon which a rotatable cutter 19, having rock drilling teeth 21, is mounted. Each cutter 19 is held on a bearing 22 of a respective leg section 13 by a ball race 24. A lubrication system, designated generally by reference numeral 23, provides lubricant to the leg section bearing 22 via passage means in the form of a leg passage 27, ball plug hole passage 29 and lubricant hole 31 for lubricating a bushing bearing surface 33, bearing shaft 17, ball race 24, and pilot pin 26.

A bearing seal 25 is provided to prevent lubricant from leaking out of the bearing and to prevent well bore fluid from entering the bearing. Furthermore, in order to prevent damage to the bearing seal 25, as a result of too great a pressure differential between the pressure of lubricant on one side and the pressure of bore hole fluid on an opposite side thereof, a pressure compensator 39 is provided in the lubrication system 23 in order to transmit the force of bore hole fluid to the lubricant in the lubrication system, thereby balancing the lubricant pressure with that of the bore hole fluid. To the extent described so far, the structure illustrated in FIG. 1 is of conventional construction, and as is typical for pressure compensators, the pressure compensator 39 is disposed within a lubricant reservoir 51 of the lubrication system 23.

Figure 2:
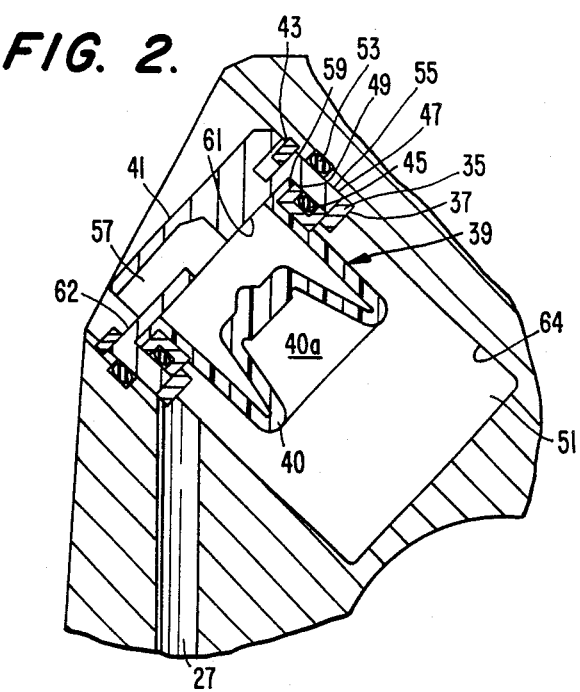
FIG. 2 is an enlarged partial cross-sectional view of the lubricant reservoir of the preferred embodiment lubrication system with a pressure compensator installed in place.

Turning now to FIG. 2, a preferred embodiment of a pressure compensator 39 for the lubrication system 23 in accordance with the present invention will now be described. Firstly, it is noted that the pressure compensator 39 is comprised of a folded wall-type, cup-like flexible diaphragm 40 that is mounted to a cap 41. More particularly, the diaphragm 40 is constructed in a manner similar to that shown in the inventor's U.S. Pat. No. 4,055,225 in that the open end (mouth) of the diaphragm has a perimetric bead-like sealing lip 59 that projects radially outwardly from the diaphragm wall, and a secondary sealing means in the form of an O-ring 45. The O-ring 45 is carried by an O-ring retainer 47 that is assembled over the peripheral wall of the diaphragm 40, the retainer 47 preferably being formed of metal and being bonded to the diaphragm 40 at the underside of the bead-like sealing lip 59.

However, unlike the diaphragm of a typical compensator for the lubrication system of an earth boring drill bit, the outer diameter of lip 59 is not substantially equal or greater than the lubricant receiving space of the lubricant reservoir. Instead, sealing lip 59 is substantially the same as the diameter of a recess that is defined by an inner peripheral wall 49 and an inner face 61 of the cap 41 of the compensator 39. In this way, the open end of the diaphragm 40 is sealed by the O-ring 45 against the inner wall 49 of the cap 41 so as to prevent leakage of well bore fluid (which enters via a vent hole 57 in the cap 41) from leaking past the diaphragm 40 into the lubricant reservoir 51.

To support and seal the compensator 39 within the reservoir 51, a shoulder ring 35 is disposed upon a shoulder 37 of the reservoir 51. This shoulder ring 35 has an inner diameter that is less than that of both the internal diameter 64 of the lubricant reservoir 51 and the diameter of the recess of the cap defined by inner wall 49. Furthermore, the combined height of O-ring retainer 47, together with the uncompressed thickness of lip 59, is slightly greater than the height of inner wall 49. Thus, during assembly, the O-ring retainer 47 will be supported upon the shoulder ring 35 and the bead-like lip 59 will be compressed by the inner face 61 of the cap 41, when the cap 41 is held in place within the reservoir 51 by a conventional spring clip type cap retainer in the form of a retaining ring 43.

In view of this construction, a tight fit is assured between the retaining ring 43, cap 41, diaphragm 40, shoulder ring 35, and lubricant reservoir shoulder 37. This resilient tight fit is necessary to ensure that the cap is held properly sealed within the reservoir 51 despite the severe vibration that earth boring drill bits are subjected to. Furthermore, this compressive fit also ensures that well bore fluid entering through the cap 41 into contact with the inner side of the diaphragm 40 cannot enter the lubricant reservoir 51 past the primary seal, formed between the inner face 61 of the cap 41 and the sealing lip 59 on the open end of the O-ring retainer 47, and the O-ring 45, even when high pressure surges occur. Additionally, external sealing of the compensator 39 is provided by an O-ring seal 53 that is disposed in a peripheral groove in the wall of the reservoir 51 so as to sealingly engage against the peripheral wall 55 of cap 41, thereby preventing leakage of well bore fluid into the lubrication system.

Figure 6:
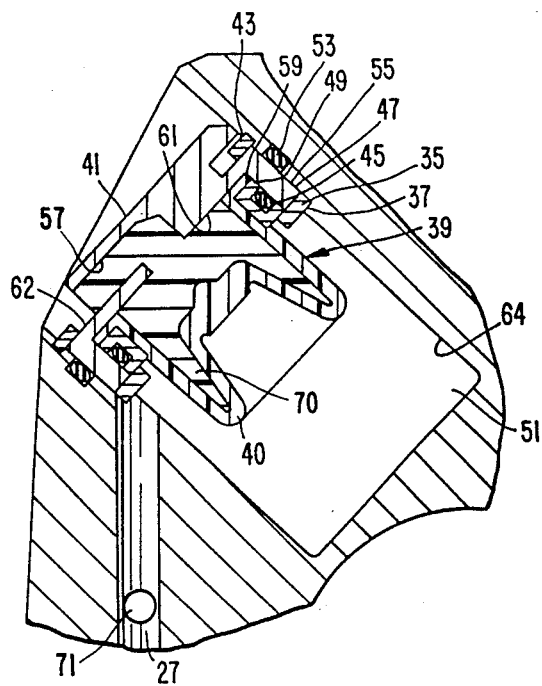
FIG. 6 is a view corresponding to FIG. 2, but with a pliable filler material mounted within the diaphragm and cap of the pressure compensator for purposes of enabling an alternative method of filling of the lubrication system to be performed.

Not only does the previously described construction and manner of mounting of the compensator 39 effectively preclude leakage of bore hole fluid into the lubrication system, but it is advantageous for other reasons as well. Firstly, since the available space in a drill bit imposes severe limits upon the size of a lubricant reservoir and pressure compensator, by recessing the diaphragm within the cap, the amount of lubricant that may be filled into the reservoir can be maximized, especially in conjunction with the filling methods described relative to FIGS. 3 and 6, below.

Additionally, by locating the pressure compensator O-ring retainer 47 within the peripheral wall 49 of the recess of cap 41 and upon the shoulder ring 35, which have a smaller internal diameter than the peripheral wall 64 defining the lubricant receiving space of the lubricant reservoir 51, a clearance of, for example, approximately 3/16 inch can be provided around the flexible diaphragm 40 of the pressure compensator 39. Such a clearance will serve to protect the diaphragm 40 from being damaged by sharp edges in the lubricant reservoir, such as those that exist at the point at which the leg passage 27 of the lubricant passage means opens into the wall 64 of the lubricant reservoir 51. Preferably, diaphragm 40 will allow approximately 4% volumetric expansion of the lubricant in the system by displacement of diaphragm 41 toward the bottom of reservoir 51.

Figure 3:
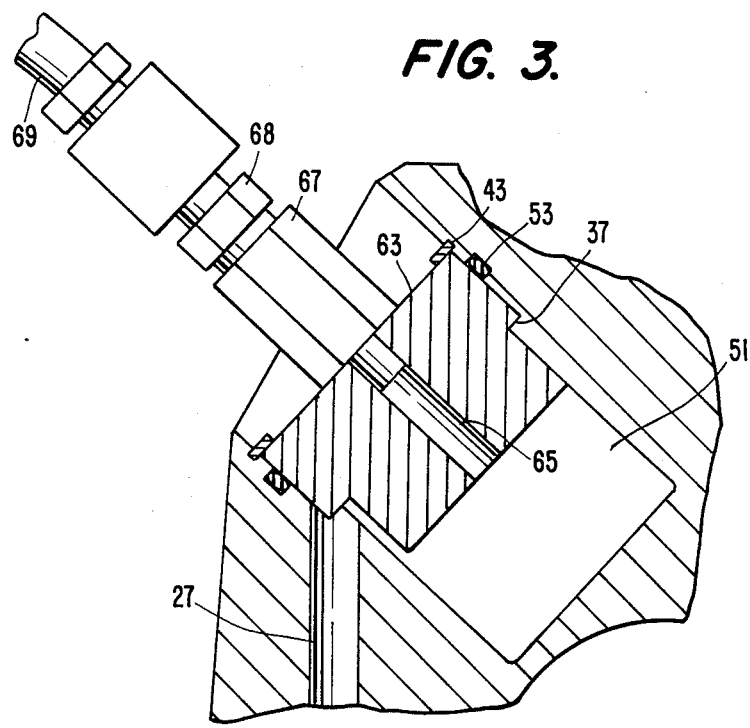
FIG. 3 is a partial cross-sectional view of a lubrication filling plug for use in accordance with a method of filling of the present invention, the plug being shown in position for filling the rock bit lubrication system with lubricant.

With reference to FIG. 3, a first method of filling the lubrication system of the present invention will now be described. In accordance with this first method, the lubrication system is filled with a conventional greaselike lubricant prior to installation of the pressure compensator 39 through the use of a special lubricating plug 63. The lubricating plug 63 has a through hole 65 through which the lubricant is introduced via a lubricant adapter 67 having a quick connect fitting 68 that is installed in the hole 65 of the lubricating plug 63. A hose line 69 is connected to the quick connect fitting 68 for evacuating of all air from the lubrication system, including lubricant reservoir 51, leg passage 27, plug hole 29, the spaces between bearing surfaces 17, 33, and the ball race 24.

To fill the system with lubricant prior to installation of the compensator shoulder ring 35 and pressure compensator 39 (including cap 41 and diaphragm 40), the lubrication plug 63 is inserted into the reservoir 51 until it seats upon the shoulder 37 thereof. In such a position, the O-ring 53 seals the lubrication plug 63 and the retaining ring 43 is used to hold the plug 63 in place during the filling process. The lubricant adapter is connected to the hose line 69 and the system is then evacuated of all air, as already noted. Once the system has been evacuated, lubricant is then pumped into the reservoir 51 and through the passage means to the leg bearing 22 through the same hose line 69, while the vacuum is held on the lubrication system. Filling is continued until the lubricant pressure is raised to 250 p.s.i. to ensure that all void spaces in the leg bearing 22 are completely filled.

Once the lubrication system is completely filled, the retaining ring 43 and the lubricating plug 63 are removed from the reservoir and the shoulder ring 35 placed on the reservoir shoulder 37. The diaphragm 40, with an O-ring 45 in its O-ring retainer 47, is placed in its folded-in configuration illustrated in FIG. 2 in place upon the shoulder ring 35. However, before placing the diaphragm 40 upon the shoulder ring 35, the diaphragm recess 40a (created by the folded-in configuration of the diaphragm 40 shown in FIG. 2) is filled with the greaselike lubricant. In this way, plug 63 need only be designed to have the exact same external configuration as the combination of the cap 41 and diaphragm 40 (i.e., without end recess 40a) to ensure that the lubrication system will be fully filled, and without having to be concerned with the potential effects of the diaphragm 40 having to be forced against a supply of lubricant to be properly inserted in place.

Once the pressure compensator diaphragm 40 is in place upon the shoulder ring 35, the compensator cap 41 is then placed in position and the retaining ring 43 forced into position by pressing down on the cap 41 sufficiently to compress the rubber bead on the top of the sealing lip 59 of the diaphragm 40. This resilient, compressive mounting of the cap 41 ensures a tight fit of the diaphragm 40 in the recess of the cap 41, and provides a sealing for the pressure compensator within the reservoir 51 which will prevent vibration of the compensator while the bit is in service, thereby ensuring that well bore fluid introduced through the vent hole 57 into contact with the outer surface of the diaphragm 40 will not leak past the compensator into the lubricant receiving space of the lubricant reservoir 51. Thus, in field service, as the bit is lowered into the well, as greater depths are reached and the hydrostatic pressure increases, or when the drill bit is pulled up for any reason, thereby reducing the hydrostatic pressure, the pressure compensator 39 will be able to act to effectively balance the pressure in the lubricant system with that of the pressure in the bore hole without fear of damage to the diaphragm or leakage into or out of the lubrication system.

Furthermore, as initially mentioned, the construction of the pressure compensator of the present invention enables its utilization as a means for converting a conventional earth boring drill bit lubrication system into one in accordance with the present invention, even if it uses a pressure compensator of the bottom vented type instead of a top vented one. To illustrate this point, reference is made to FIG. 4 wherein a prior art rock drill bit lubrication system reservoir and compensator of the type known from the inventor's U.S. Pat. No. 4,055,225 is shown.

In particular, the pressure compensator 100 of this prior art lubrication system is located in a lubricant reservoir 102 which communicates with lubricant passage means 104 leading to the cutter bearings. The reservoir 102 also is formed with a bottom vent passage 106 which provides a means for the bore hole fluid to enter the lubricant reservoir 102 at the underside of diaphragm 108. Thus, the flexible diaphragm 108 of the compensator 100 is disposed at the bottom of reservoir 102 where the O-ring 110, disposed in the O-ring retainer 112, sealingly engages the wall of reservoir 102. Diaphragm 108 is held in place by a generally cup-shaped protector member 114 against which the compensator cap 116 abuts when it is held in place within the upper end of the reservoir 102 by a retaining ring 118. For completeness, it is also noted that the periphery of the cap 116 is sealed against leakage by an O-ring 120, and the system is filled with lubricant via a through hole 122 in the cap 116 that is then sealed by a screw-threaded plug 124 after filling. A relief valve receiving bore 126 is also shown, in broken lines.

Figure 4:
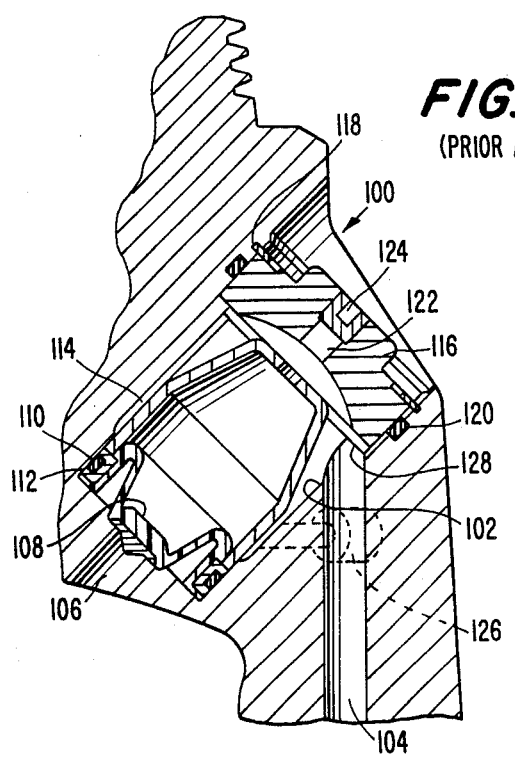
FIGS. 4 and 5 illustrate, respectively, a prior art rock drill bit lubrication system reservoir and compensator, and the same after retrofit conversion thereof into a lubrication system in accordance with the present invention.
Figure 5:
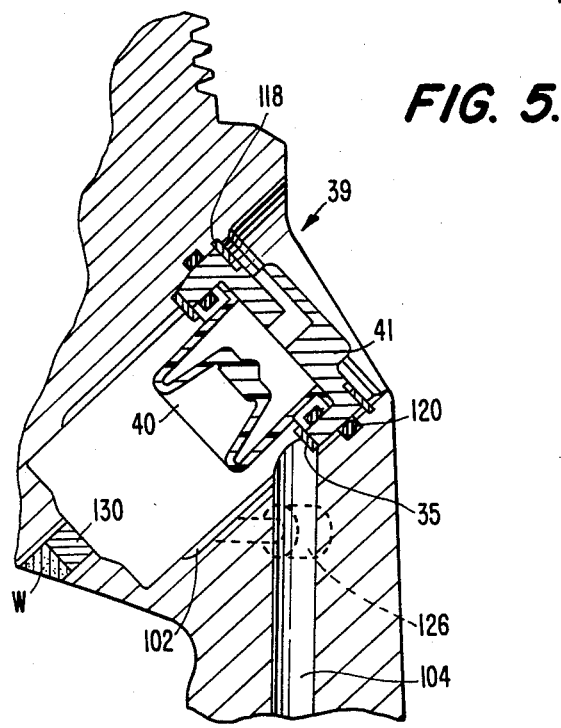

Turning now to FIG. 5, the manner in which the FIG. 4 system can be converted into a lubrication system, in accordance with the present invention, will now be described. Firstly, the pressure compensator 100 is removed from the reservoir 102 and the pressure relief valve may be removed from the bore 126. At this point in time, if the lubrication system is to be filled in the manner described relative to FIG. 3, a plug 130 is inserted into the bottom vent hole 6 and fixed by a weld bear W, (alternatively weld beads can be applied to close both ends of hole 106 without using plug 130) and similar action is taken relative to bore 126 if the pressure relief valve is to be removed as well; although it is not essential that the pressure relief valve be removed.

After filling, the shoulder ring 35 may be placed upon the reservoir shoulder 128, which formally served in the prior art device as a stop surface for the compensator cap 116. Thereafter, the diaphragm 40 and cap 41 are inserted and held in place by the retaining ring 118, so that the pressure compensator 39 is then installed in the lubrication system without any major modifications having had to have been made. Alternatively, when retrofit installing of the present invention by conversion of a bottom vented compensator type lubrication system, the possibility exists, in the case of some longer size bits, for the compensator 39, as a whole, to be installed in place prior to filling of the system with lubricant, in the manner to be described relative to FIG. 6, in which case the insertion and welding in place of plug 130 within vent hole 106 or the plugging of bore 126 would be deferred until after filling of the system with lubricant, so that it may serve the role of port 71, described relative to the FIG. 6 arrangement, however, in most cases, the vent hole 106 would be plugged prior to filling the lubrication system and bore 126 will be used for filling.

As previously mentioned, a second method of filling of the lubrication system is contemplated in accordance with the present invention. In accordance with this method, the bit and lubrication system, including the compensator 39, is completely assembled and the lubrication adapter 67 (FIG. 3) attached to the outer end of filling port 71 (FIG. 1), this port 71 connecting, at its inner end, with the leg passage 27. In this manner, the lubrication system is able to be evacuated and then lubricant pumped in through the adapter 67 until the lubricant pressure reaches 250 p.s.i. with compensator 39 in place. Thereafter, the adapter 67 is removed and a pressure plug is installed within the port 71.

However, in order to prevent collapsing or stretching of the diaphragm 40 under the effect of the lubricant being pumped therein, in accordance with this aspect of the present invention, a resiliently pliable, putty-like material 70 is placed within the space formed internally of the compensator 39 between the diaphragm 40 and cap 41. The cap is then temporarily sealed by plug 42 which is removed after the tube system has been completely filled with lubricant. The material 70 may be any pliable material having sufficient temperature and chemical resistance to enable it to be exposed to the temperatures and well bore fluids to which the drill bit is exposed in use. Suitable materials are readily identifiable. For example, materials used by dentists to form impressions, and a silicone compound sold by Dow Corning as number 3179 Dilatent compound which is the commonly well-known putty sold under the trademark "Silly Putty" may used, as they possess the requisite characteristics.

Not only does the use of a putty-like filling material prevent collapsing and stretching of the diaphragm 40 in use, while still permitting the system to be fully filled to capacity with the compensator in its installed condition, but the use of such a material also enables the amount of bore hole fluids and cuttings that enter the compensator recess to be minimized and the potential for leakage of bore hole fluid into the lubrication system to be further reduced. Furthermore, such a pliable filler material is able to flow and deform in a manner enabling the bore hole fluid pressure to be transmitted to the diaphragm and will not interfere with the ability of the diaphragm to fold in and out in an axial direction in response to fluid pressure differentials across the diaphragm, so that the normal operation of such a folded wall type diaphragm will not be adversely affected.

From the foregoing, it should be apparent how the present invention achieves all of the objects initially set out for it. Furthermore, it should be appreciated that the present invention is not limited to the specific embodiments and features as described herein, but rather will be subject to numerous changes and modifications that will be apparent to those of ordinary skill in the art. For example, the shoulder ring 37 need not be a separate part from the compensator cap 41, as shown and described. Instead, the shoulder ring could be formed as an integral, inwardly directed flange-like portion of the inner wall 49 of the cap recess. In such a case, the inner face 61 would be formed as the lower face of a removable central portion of a two-piece compensator cap 41, this central portion being removed for insertion of the diaphragm 40 and then sealed in place, compressing the bead of the lip 59 between the integral shoulder ring and face 61. Thus, since numerous other modifications and changes will be possible without departing from the basic concepts of the present invention, the present invention should not be viewed as limited to the specific embodiments and features described herein, but rather as covering all such changes and modifications as are encompassed by the scope of the appended claims.

I claim:

1. Lubrication system of an earth boring drill bit of the type having a bit body, cutters depending from the bit body and rotatably mounted on bearings, a lubricant reservoir formed in said bit body, lubricant passage means for supplying lubricant from the reservoir to the bearings of the cutters, a cap sealed in the top of said reservoir, a folded wall-type, cup-like flexible diaphragm supported at one end by said cap and mounted so that the opposite unsupported end extends from said cap into said lubricant reservoir to contact lubricant disposed in said reservoir at a first side of the flexible diaphragm, and vent means provided in said cap for admitting well bore fluid into contact with said flexible diaphragm at a second, opposite, side thereof from that contacting the lubricant in the reservoir; wherein said cap has a recess that is peripherally bounded by an inner wall, the diameter of the recess being reduced relative to the diameter of the lubricant reservoir; and wherein an open end of said flexible diaphragm is sealingly mounted within said recess against said inner wall so as to extend into said reservoir with a sufficient peripheral clearance between the folded wall of the diaphragm and the reservoir so as to prevent damage to the diaphragm by expansion thereof, in use, against sharp edges of the reservoir.

2. Lubrication system according to claim 1, wherein said reservoir is formed with a shoulder, wherein a shoulder ring having an inner diameter that is less than the diameter of said inner wall of the recess of said cap is supported on said shoulder of the reservoir, and wherein said diaphragm is axially supported upon said shoulder ring.

3. Lubrication system according to claim 2, wherein said shoulder ring is a separate part from said cap and is clamped between said shoulder and said cap.

4. Lubrication system according to claim 2, wherein an O-ring retainer is mounted to said diaphragm about the open end thereof, and wherein an O-ring is provided in said O-ring retainer for sealing against the inner wall of said recess.

5. Lubrication system according to claim 4, wherein said O-ring retainer is supported on said shoulder ring, and wherein said cap is secured in said reservoir by a retaining ring with a bead-like sealing lip of said diaphragm compressed between a bottom wall of said recess and said O-ring retainer.

6. Lubrication system according to claim 1, wherein sufficient space is provided between said cap and said diaphragm to allow an approximately 4% volumetric expansion of the lubricant in the system by displacement of said diaphragm toward a bottom wall of said recess.

7. Lubrication system according to claim 1, wherein a pliable, putty-like filler material is provided in an interior space of the compensator that is formed between said cap and said diaphragm.

8. Method of filling a lubrication system of an earth boring drill bit of the type having a bit body, cutters depending from the bit body and rotatably mounted on bearings, a lubricant reservoir formed in said bit body, lubricant passage means for supplying lubricant from the reservoir to the bearings of the cutters, a cap sealed in the top of said reservoir, a folded wall-type, cup-like flexible diaphragm mounted so as to extend from said cap into said lubricant reservoir so as to contact lubricant disposed in said reservoir at a first side of the flexible diaphragm, and vent means provided in said cap for admitting well bore fluid into contact with said flexible diaphragm at a second, opposite, side thereof from that contacting the lubricant in the reservoir, comprising the steps of:
(A) sealingly mounting a lubricating plug, having a through hole and an external configuration matched to that of the cap and diaphragm, within the reservoir;
(B) evacuating air from the lubricating system via a hose coupled to said through hole, and then filling the lubrication system with lubricant via said hose to a lubricant pressure of approximately 250 p.s.i.;
(C) removing said plug from said reservoir;
(D) filling a recess formed in a bottom end of the folded wall diaphragm with lubricant and mounting it on a shoulder ring; and
(E) sealingly mounting said cap in said reservoir with said diaphragm compressed against said shoulder ring and extending into said reservoir from said cap.

9. Method of filling a lubrication system of an earth boring drill bit of the type having a bit body, cutters depending from the bit body and rotatably mounted on bearings, a lubricant reservoir formed in said bit body, lubricant passage means for supplying lubricant from the reservoir to the bearings of the cutters, a cap sealed in the top of said reservoir, a folded wall-type, cup-like flexible diaphragm mounted so as to extend from said cap into said lubricant reservoir so as to contact lubricant disposed in said reservoir at a first side of the flexible diaphragm, and vent means provided in said cap for admitting well bore fluid at a second, opposite, side of the flexible diaphragm from that contacting the lubricant in the reservoir, comprising the steps of:
(A) installing said cap and diaphragm within said reservoir with a pliant, putty-like material filling an interior space formed between the diaphragm and the cap;
(B) evacuating air from the lubrication system via a hose coupled to the lubrication system via a through hole formed in said bit body and then filling the lubrication system with lubricant pumped through said hose to a lubricant pressure of approximately 250 p.s.i.; and
(C) plugging said through hole to seal the lubricant within the lubrication system.

10. Method of retrofit converting of an earth boring drill having a pressure compensator with a diaphragm having a maximum diameter that is at least substantially as large as that of a peripheral wall of a lubricant reservoir of a lubrication system within which it is mounted, comprising the steps of:
(A) removing and discarding said pressure compensator;
(B) mounting a shoulder ring in the reservoir, said shoulder ring having an inner diameter that is smaller than the diameter of the peripheral wall of the reservoir; and
(C) installing a retrofit pressure compensator upon said shoulder ring, said retrofit pressure compensator comprising a cap having a recess that is bounded peripherally by an inner wall having a diameter that is reduced relative to that of the reservoir and a folded wall type diaphragm having an open end sealingly mounted within said recess against said inner wall so as to extend into said reservoir with a sufficient peripheral clearance between the folded wall of the diaphragm and the reservoir so as to prevent damage to the diaphragm by expansion thereof, in use, against sharp edges of the reservoir.

11. Lubrication system of an earth boring drill bit of the type having a bit body, cutters depending from the bit body and rotatably mounted on bearings, a lubricant reservoir formed in said bit body, lubricant passage means for supplying lubricant from the reservoir to the bearings of the cutters, a cap sealed in the top of said reservoir, a folded wall-type, cup-like flexible diaphragm mounted so as to extend from said cap into said lubricant reservoir so as to contact lubricant disposed in said reservoir at a first side of the flexible diaphragm, and vent means provided in said cap for admitting well bore fluid into contact with said flexible diaphragm at a second, opposite, side thereof from that contacting the lubricant in the reservoir; wherein said cap has a recess that is peripherally bounded by an inner wall, the diameter of the recess being reduced relative to the diameter of the lubricant reservoir; wherein an open end of said flexible diaphragm is sealingly mounted within said recess against said inner wall so as to extend into said reservoir with a sufficient peripheral clearance between the folded wall of the diaphragm and the reservoir so as to present damage to the diaphragm by expansion thereof, in use, against sharp edges of the reservoir; and wherein said reservoir is formed with a shoulder, wherein a shoulder ring having an inner diameter that is less than the diameter of said inner wall of the recess of said cap is supported on said shoulder of the reservoir, and wherein said diaphragm is axially supported upon said shoulder ring.

12. Lubrication system according to claim 11, wherein said shoulder ring is a separate part from said cap and is clamped between said shoulder and said cap.

13. Lubrication system of an earth boring drill bit of the type having a bit body, cutters depending from the bit body and rotatably mounted on bearings, a lubricant reservoir formed in said bit body, lubricant passage means for supplying lubricant from the reservoir to the bearings of the cutters, a cap sealed in the top of said reservoir, a folded wall-type, cut-like flexible diaphragm mounted so as to extend from said cap into said lubricant reservoir so as to contact lubricant disposed in said reservoir at a first side of the flexible diaphragm, and vent means provided in said cap for admitting well bore fluid into contact with said flexible diaphragm at a second, opposite, side thereof from that contacting the lubricant in the reservoir; wherein said cap has a recess that is peripherally bounded by an inner wall, the diameter of the recess being reduced relative to the diameter of the lubricant reservoir; wherein an open end of said flexible diaphragm is sealingly mounted within said recess by an O-ring retainer mounted to said diaphragm about the open end thereof and an O-ring is provided in said O-ring retainer for sealing said diaphragm against said inner wall so said diaphragm extends into said reservoir with a sufficient peripheral clearance between the folded wall of the diaphragm and the reservoir so as to prevent damage to the diaphragm by expansion thereof, in use, against sharp edges of the reservoir; and wherein said reservoir is formed with a shoulder, wherein a shoulder ring having an inner diameter that is less than the diameter of said inner wall of the recess of said cap is supported on said shoulder of the reservoir, and wherein said diaphragm is axially supported upon said shoulder ring.

14. Lubrication system according to claim 13, wherein said O-ring retainer is supported on said shoulder ring, and wherein said cap is secured in said reservoir by a retaining ring with a bead-like sealing lip of said diaphragm compressed between a bottom wall of said recess and said O-ring retainer.

* * * * *